June 13, 1944.    J. M. SIMPSON    2,351,553
BLOCKER
Filed Jan. 9, 1942    3 Sheets-Sheet 1
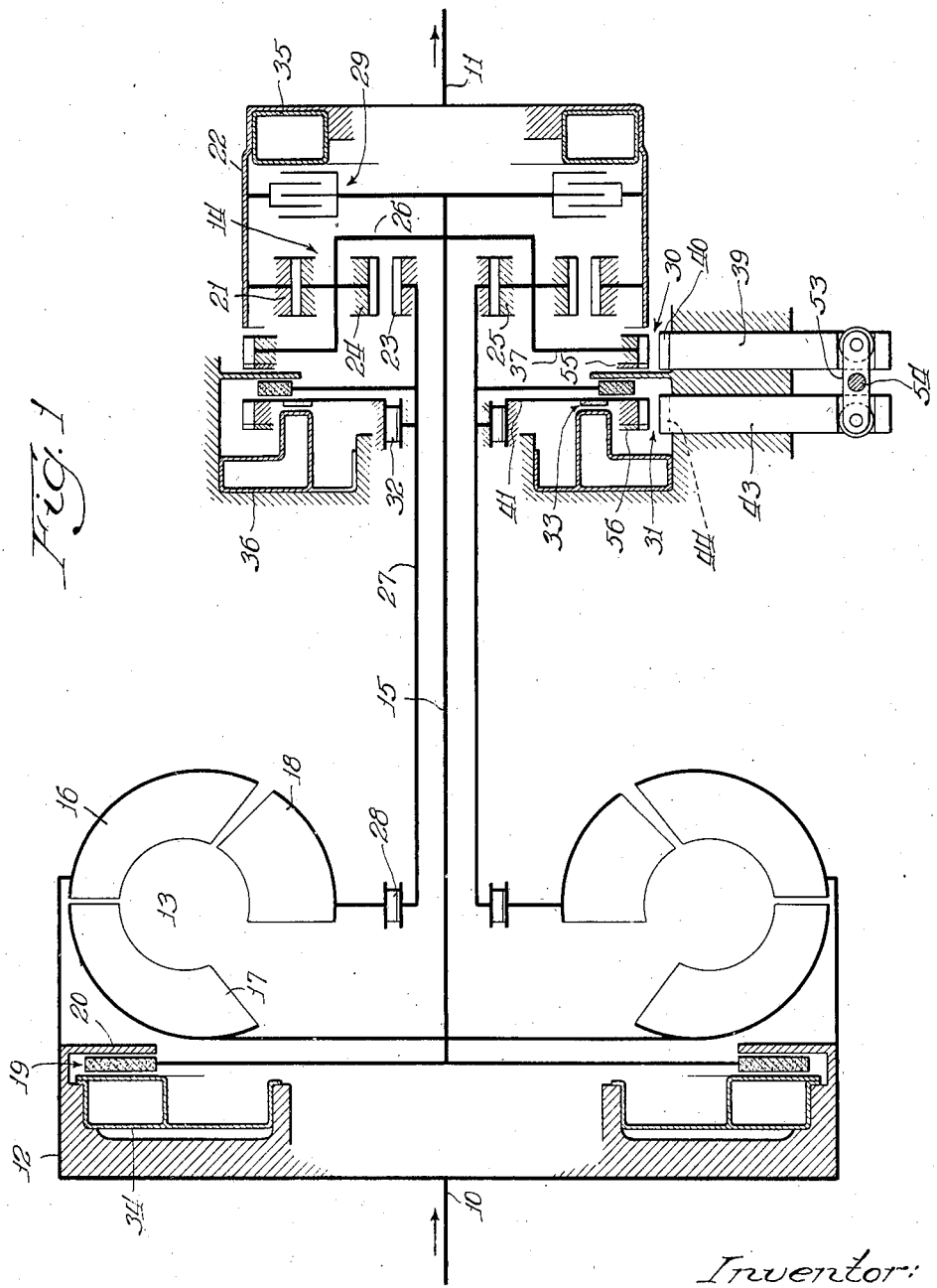
Inventor:
John M. Simpson
By Edward C. Gritzbaugh
Atty.

June 13, 1944.  J. M. SIMPSON  2,351,553
BLOCKER
Filed Jan. 9, 1942  3 Sheets-Sheet 2
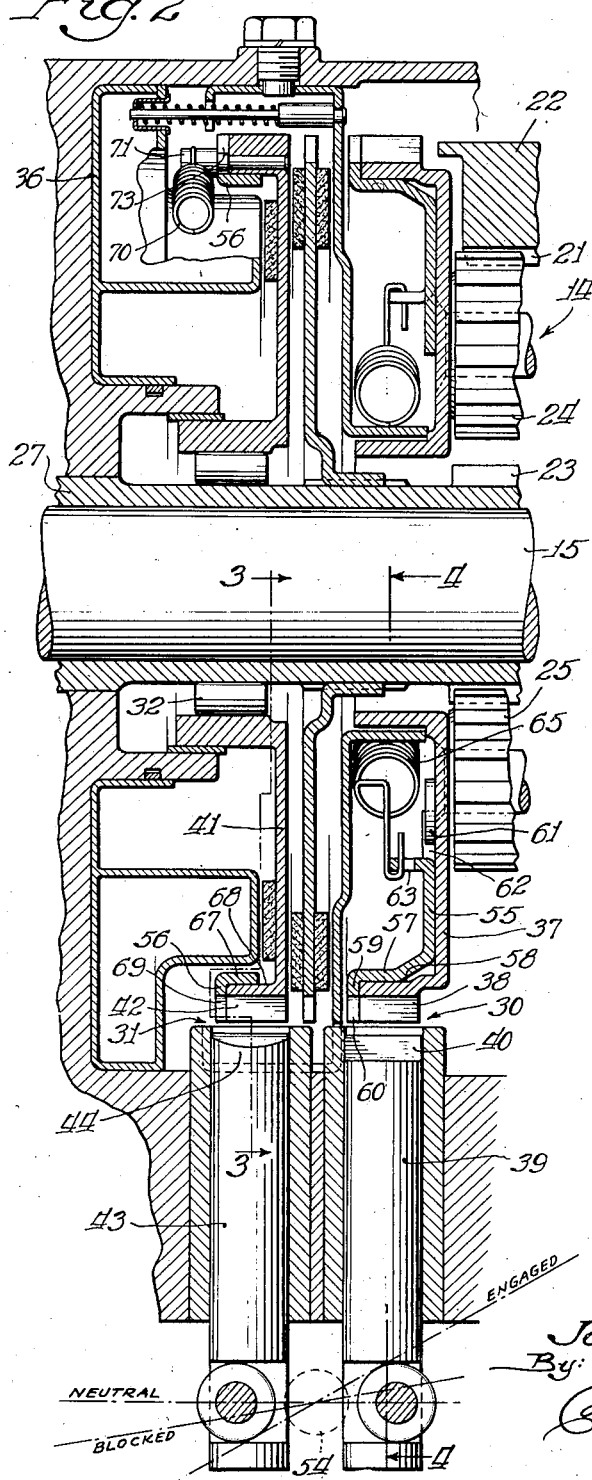
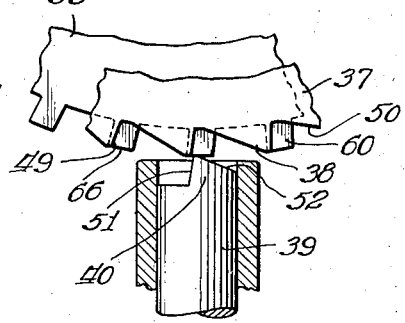
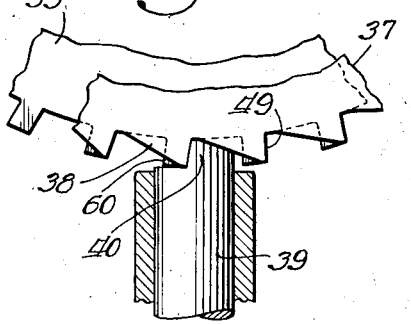
Inventor:
John M. Simpson,
By: Edward C. Gritzbaugh June 13, 1944. J. M. SIMPSON 2,351,553
BLOCKER
Filed Jan. 9, 1942 3 Sheets-Sheet 3
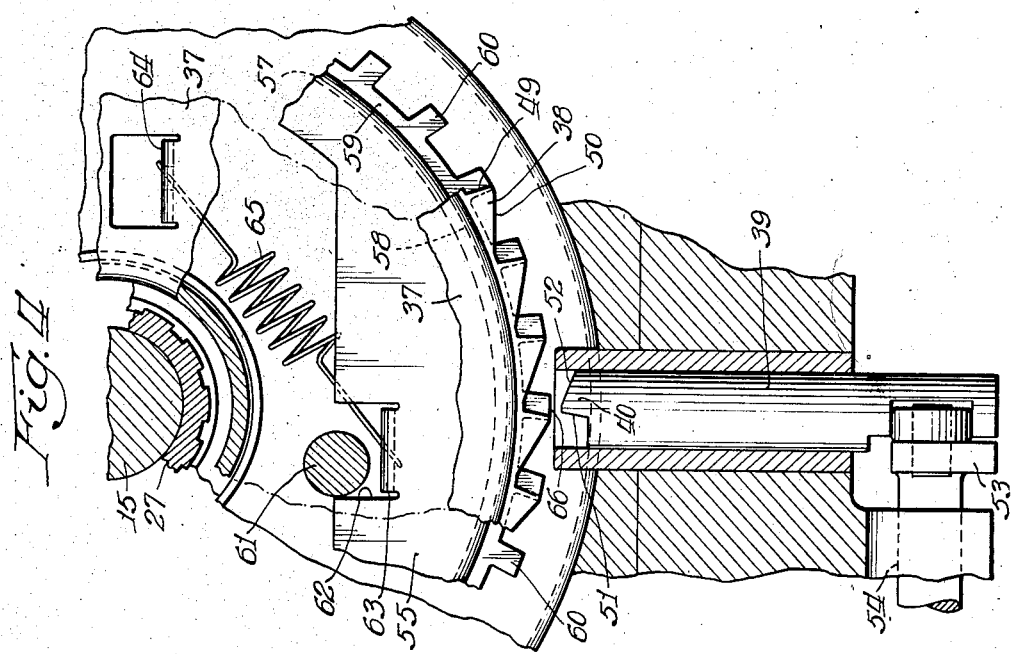
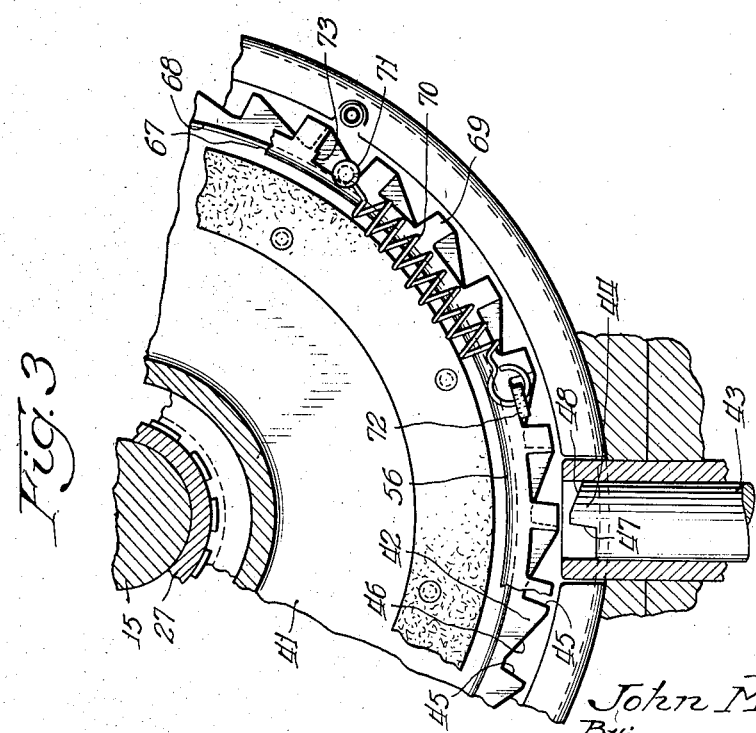
Inventor:
John M. Simpson
By Edward C. Fitzbaugh Patented June 13, 1944

2,351,553

UNITED STATES PATENT OFFICE 2,351,553

BLOCKER

John M. Simpson, Muncie, Ind., assignor to Borg-Warner Corporation, Chicago, Ill., a corporation of Illinois Application January 9, 1942, Serial No. 426,125

15 Claims. (Cl. 188—81)

This invention relates to a blocker for a ratchet and pawl mechanism. The invention will be described with particular reference to a transmission in which such a mechanism may be used, said transmission being of the type described in detail in the copending application of Simpson and Carnagua, Serial No. 426,122, filed January 9, 1942.

The principal object of this invention is to provide a means for preventing a partial engagement of a pawl with a ratchet which would damage the teeth of the ratchet or pawl.

A more specific object of this invention is to provide a blocker for a pawl which will prevent a movement of the pawl toward the ratchet wheel when the pawl is nearly aligned with a tooth of the cooperating ratchet wheel on the approach side of a tooth.

Another specific object of this invention is to provide a blocker for a pawl which will prevent the pawl from moving radially inward except at such times when the pawl may be substantially completely engaged with its cooperating ratchet wheel, the blocker being then movable relative to the ratchet wheel to permit the pawl to contact the teeth of the ratchet wheel.

A further specific object of the invention is to provide a suitable inexpensive mounting and control mechanism for a blocker of the type described.

These and other objects and features of the invention will become apparent from the following description when taken together with the accompanying drawings in which:

Fig. 1 is a schematic elevation in section of an automatic transmission to which this invention may be applied;

Fig. 2 is a section in elevation of a pair of ratchet wheels provided with the novel blocker;

Fig. 3 is a fragmentary section taken along lines 3—3 of Fig. 2;

Fig. 4 is a fragmentary section taken along lines 4—4 of Fig. 2;

Fig. 5 shows the blocker in blocking position; and

Fig. 6 shows the blocker in unblocked position.

Referring now to Fig. 1 for a description of a transmission to which this invention may be applied, said transmission is comprised of a drive shaft 10, a driven shaft 11, a housing 12 driven from drive shaft 10 and driving a hydraulic torque converter 13, and a planetary gear set 14 driven from hydraulic torque converter 13 through an intermediate shaft 15. The converter 13 is comprised of a pump element 16, a turbine element 17 and a stator element 18, turbine element 17 being directly connected to intermediate shaft 15. Also directly connected to intermediate shaft 15 is a clutch disc 19 which is adapted to be driven frictionally by housing 12 through a flange 20 and a piston 34.

Planetary gear set 14 is comprised of a ring gear 21 connected by means of a drum 22 to driven shaft 11, a sun gear 23 and a series of double planet gears 24 and 25, said planet gears being mounted on a carrier 26 which is directly connected to intermediate shaft 15. Said planet gears are so arranged that ring gear 21 meshes with planet pinion 24 which in turn meshes with planet pinion 25, the latter being in mesh with sun gear 23. The arrangement is such that when carrier 26 is held against rotation, sun gear 23 and ring gear 21 will rotate in the same direction.

Sun gear 23 is connected to a sleeve 27 which is connected by means of an overrunning clutch 28 to stator 18. Carrier 26 may be directly connected to ring gear 21 by means of a clutch 29 to establish a direct drive between intermediate shaft 15 and driven shaft 11. Carrier 26 is provided with a brake mechanism of the ratchet pawl type 30, and another brake mechanism 31 of the same type is provided for sun gear 23, said brake mechanism 31 acting through the intermediary of an overrunning clutch 32. An auxiliary friction type brake 33 is also provided for sun gear 23. It is contemplated that friction disc 19, clutch 29 and auxiliary friction brake 33 will be controlled by pistons 34, 35 and 36 respectively, which in turn are controlled by suitable fluid pressure means.

The operation of the transmission is as follows:

For forward low speed drive, brake 31 is applied after friction brake 33 has been momentarily applied and then released to make sure that there would be no undue ratcheting in brake 31. With a load on driven shaft 11 and with driving torque applied to intermediate shaft 15 through hydraulic torque converter 13, the reaction on sun gear 23 will be in a reverse direction. The teeth on brake 31 and overrunning clutch 32 are so arranged as to take reaction in this direction. The drive will then be from drive shaft 10 to torque converter 13, intermediate shaft 15, carrier 26, ring gear 21 and drum 22 to driven shaft 11 for a low speed high-torque drive. At some appropriate speed clutch 29 will be engaged which will lock-up planetary gear set 14 and cause sun gear 23 to rotate in the same direction as intermediate shaft 15. Although at this point brake 31 remains engaged, the connection between sun gear 23 and brake 31 will be broken through overrunning clutch 32 and the drive will then be a direct drive through the planetary gear 14, and a hydraulic drive through the torque converter 13. At a still higher speed, clutch disc 19 is clamped against flange 20 by piston 34 to establish a direct drive connection between drive shaft 10 and intermediate shaft 15, thereby rendering ineffective hydraulic torque converter 13. For reverse drive, the functions of stator 18 and turbine element 17 are interchanged so that the turbine element is held stationary and the stator element 18 is permitted to rotate in a reverse direction. To hold turbine element 17 against rotation, brake 30 is applied, which arrests the rotation of carrier 26, the connected intermediate shaft 15 and turbine element 17. Clutch disc 19 is, of course, released for reverse drive, as are also clutch 29 and brake 31. With carrier 26 held against rotation and sun gear 23 rotated in a reverse direction, ring gear 21 will likewise be rotated in a reverse direction to establish the desired reverse drive in driven shaft 11.

It is apparent that for reverse drive and for forward drive, brakes 30 and 31 may be engaged when hydraulic torque converter 13 is rotated at idling speed. It is a characteristic of such hydraulic torque converters that they transmit some torque even at idling speed and accordingly, the engagement of brakes 30 and 31 must take place while driving torque is present in their respective ratchet wheels. This means that unless some precaution is taken, a partial engagement of these brakes would result in an unpleasant noise as well as in possible damage to the teeth themselves. It is to eliminate this unpleasant noise and possible damage to the teeth that the novel blocker mechanism has been devised.

It will be observed from Fig. 2 that brake 30 is comprised of a ratchet wheel 37 having teeth 38 on the outer periphery thereof which are adapted to be engaged by a radially slidable pawl 39 having a cooperating tooth 40 formed in the end thereof. Similarly, brake 31 is comprised of a ratchet wheel 41 having teeth 42 formed in the outer periphery thereof and adapted to be engaged by a pawl 43 having a tooth 44 formed in the end thereof. Due to the fact that the reactions in brakes 30 and 31 are in opposite directions at the time that said brakes are intended to be engaged, the teeth on ratchet wheels 37 and 41 are made to slope in opposite directions. Thus (Fig. 3) teeth 42 are provided with load holding faces 45 which face in a direction opposite to the normal direction of rotation of shaft 15, the backs 46 of the teeth being sloped to eject tooth 44 of pawl 43. Similarly, tooth 44 of pawl 43 is provided with a load holding face 47 and a sloping face 48, the latter cooperating with sloping face 46 of teeth 42 to eject pawl 43 when the direction of rotation is in a clockwise direction as viewed in Fig. 3. Teeth 38 (Fig. 4) of ratchet wheel 37 are provided with load holding faces 49 which face in a direction opposite to that of load holding faces 45 of teeth 42 on ratchet wheel 41. The backs 50 of teeth 38 are sloped to eject pawl 39 when the direction of rotation is clockwise as viewed in Fig. 4. It should be noted here that Figs. 3 and 4 are taken from opposite sides of the transmission. Tooth 40 of pawl 39 is likewise provided with a load holding face 51 and a sloping back 52 which cooperates with sloping surfaces 50 of teeth 38 to eject pawl 39.

Pawls 39 and 43 are controlled by means of a lever 53 (Fig. 1) pivoted at 54 and which may be rocked about pivot 54 by a suitable external control (not shown).

It will be observed in Figs. 3 and 4 that next to teeth 38 is a toothed wheel 55, and adjacent teeth 42 is a toothed wheel 56. Said wheels 55 and 56 contain the blockers for teeth 38 and 42, respectively. Blocker 55 is comprised of an annular stamping or light casting which is held in place on ratchet wheel 37 by means of a formed cylindrical portion 57 which fits snugly against a cylindrical surface 58 formed in ratchet wheel 37. Said stamping terminates in a radial flange 59 on which are formed substantially square teeth 60. Stamping 55 is mounted for limited rotational movement with respect to ratchet wheel 37, the limits of rotational movement being determined by a pin 61 located on wheel 37 and positioned in a slot 62 on stamping 55 formed by turning in a lug 63. A similar lug 64 is formed on wheel 37. A tension spring 65 is connected between lugs 63 and 64 and normally tends to rotate stamping 55 in a counterclockwise direction (Fig. 4) to a blocking position.

It will be noted that when teeth 60 are in a blocking position, a flat surface 66 is presented to the end of pawl 39, the flat surfacing being level with the ends of teeth 38 on ratchet wheel 37. Should pawl 39 attempt to enter ratchet wheel 37 in the space occupied by the teeth 60, said entry will be blocked and prevented. If it were not prevented, a complete engagement would not be effected since tooth 40 of pawl 39 would not have sufficient space and time in which to reach the bottom of a tooth 38 of the ratchet wheel. Blocker teeth 66 therefore cause the end 40 of pawl 39 to stay out of contact with a tooth 38 until it rides over the end of said tooth 38 and begins to slide down sloping face 50 toward engagement with the adjacent tooth. In so doing the pawl has the entire space between adjacent teeth in which to operate and can therefore enter fully the next tooth. As it continues to slide down face 50, it engages the square side of tooth 60 and then commences to move blocker tooth 60 with it until a load holding face 49 of the adjacent tooth is contacted.

The relation between pawl 39, ratchet teeth 38 and blocker teeth 60 during blocking position of the latter is illustrated in Fig. 5. It is apparent that pawl 39 cannot move radially inwardly while the end of the pawl is contacting the outer end of a tooth 60. The relation between pawl 39, tooth 38 and blocker tooth 60 when the pawl is in engagement with ratchet wheel 37 is shown in Fig. 6. It will be observed that blocker teeth 60 in no way interferes with the full engagement of pawl 39 with ratchet wheel 37.

Since pawl 39 may engage any one of the teeth 38 of ratchet wheel 37, there must be a blocker tooth 60 for each tooth 38 of the ratchet wheel. For this reason the pitch of teeth 60 is identical with the pitch of teeth 38 of the ratchet wheel. The circular length of each tooth 60 is determined by the circular length of pawl 39. Since the latter must fit between adjacent blocker teeth 60 and must likewise be sufficiently strong to withstand the loads imposed thereon, the circular length of teeth 60 will be equal to the pitch between adjacent teeth, minus the circular length of tooth 40 of the pawl, minus a small clearance.

Blocker 56 is illustrative of a modified form (Fig. 2). It is comprised of a drum 67 which fits into a recess 68 in ratchet wheel 41. The teeth 69 of the blocker are formed in a radial flange located adjacent teeth 42 of the ratchet wheel. Said blocker 56 is likewise adapted to oscillate from a blocking position to a non-blocking position, the oscillation being controlled by a spring 70 (Fig. 3) which is tensioned between a pin 71 secured to ratchet wheel 41 and a lug 72 formed in blocker 56. The amount of oscillation permitted is determined by the width of a slot 73 in blocker 56 in which pin 71 is received. Spring 70 normally maintains blocker 56 in blocking position, and the blocker is moved into non-blocking position by the engagement of tooth 44 of pawl 43 with a tooth 42 of the ratchet wheel. The factors determining the shape of the blocker teeth 69 are the same as those described with reference to blocker teeth 60 of Fig. 4, and the operation of blocker 56 is identical with the operation of blocker 55 with the exception, of course, that blocker 56 is effective in the opposite direction from that of blocker 55.

It is understood that although the blocker disclosed herein is described with reference to its use on a ratchet and pawl type brake in conjunction with a specific transmission, the blocker is equally as well adapted for use with a rotatable pawl and ratchet wheel used as a clutch in a totally different transmission. The scope of the invention therefore, is not to be limited to the above illustrative embodiment but is to be determined by the appended claims.

I claim:

1. In combination, a rotatable element having teeth formed thereon, said teeth being provided with a load holding face on one side, a pawl having a load holding face adapted to engage a load holding face of a tooth, means for making an engagement of the pawl with a tooth while said element is rotating in a single direction to stop the element, and means for preventing a partial such engagement of the pawl with a tooth to prevent injury to the ends of the teeth or pawl.

2. In combination, a rotatable element having teeth formed thereon, said teeth being provided with a load holding face on one side, a pawl having a load holding face adapted to engage a load holding face of a tooth, means for making an engagement of the pawl with a tooth while said element is rotating in a single direction to stop the element, and means for preventing a partial such engagement of the pawl with a tooth to prevent injury to the ends of the teeth or pawl, said means for preventing partial engagement being movable out of the way of the pawl when substantially complete engagement is effected.

3. In combination, a rotatable element having teeth formed thereon, said teeth each being provided with a load holding face on one side, a pawl movable toward said element and having a load holding face adapted to engage a load holding face of a tooth on such movement of the pawl, means for making an engagement of the pawl with a tooth while said element is rotating in a single direction to stop the element, and means for preventing movement of the pawl toward engaging position with a tooth when said element is so rotating and the element is so rotatively disposed with respect to the pawl that the load holding faces of the pawl and tooth would be less than a predetermined distance apart if the pawl were in engaging position with respect to the tooth, whereby a partial engagement of the pawl and tooth is prevented.

4. In combination, a rotatable element having teeth formed thereon, said teeth each being provided with a load holding face on one side, a pawl movable toward said element and having a load holding face adapted to engage a load holding face of a tooth on such movement of the pawl, means for making an engagement of the pawl with a tooth while said element is rotating in a single direction to stop the element, means for obstructing movement of the pawl toward engaging position with a tooth when said element is so rotating and the element is so rotatably disposed with respect to the pawl that the load holding faces of the pawl and tooth would be less than a predetermined distance apart if the pawl were in engaging position with respect to the tooth, whereby a partial engagement of the pawl and the tooth is prevented, said pawl obstructing means being movable out of the way of the pawl when the load holding faces of the pawl and tooth are in engagement.

5. In combination, a rotatable element having teeth formed thereon, said teeth being provided with a load holding face on one side, a pawl having a load holding face adapted to engage a load holding face of a tooth, means for engaging the pawl with a tooth, and means continuously rotatable with said element and adapted to be interposed in the path of the pawl from a point for each tooth corresponding with the point at which the end of the pawl contacts the end of the tooth to a point in the space between the tooth and an adjacent tooth on the element, whereby partial engagement of the pawl with any one of the teeth is prevented.

6. In combination, a rotatable element having teeth formed thereon, said teeth being provided with a load holding face on one side, a pawl having a load holding face adapted to engage a load holding face of the tooth, means for engaging the pawl with a tooth, and a toothed wheel continuously rotatable with said rotatable element adapted to cooperate with the pawl to prevent a partial engagement of the pawl with any one of the teeth.

7. In combination, a rotatable wheel having teeth formed thereon, said teeth being provided with a load holding face on one side, a pawl having a load holding face adapted to engage a load holding face of a tooth, means for engaging the pawl with a tooth, and a toothed wheel adjacent the first-mentioned wheel and continuously rotatable therewith and adapted to cooperate with said pawl to prevent a partial engagement of the pawl with any one of the teeth of the first-mentioned wheel.

8. A combination as described in claim 7, said second-mentioned wheel being oscillatable with respect to the first-mentioned wheel from a position wherein the teeth of said second-mentioned wheel prevent partial engagement of the pawl with a tooth, to a position where it will not interfere with the engagement of the load holding faces of the pawl and first-mentioned toothed wheel.

9. In combination, a rotatable element having teeth formed thereon, said teeth being provided with a load holding face on one side and a sloping face on the other, a pawl having a load holding face adapted to engage a load holding face of a tooth and a sloping face adapted to engage a sloping face of a tooth, means for urging the pawl toward a tooth, and means normally obstructing a portion of the space between adjacent teeth, said means being adapted to prevent a movement of the pawl toward a tooth under conditions which would result in partial engagement therebetween, and interposing no obstruction to the engagement of the sloping faces of the teeth and pawl whereby to facilitate a complete engagement of the pawl with a tooth.

10. In combination, a ratchet wheel, a pawl adapted to cooperate with the ratchet wheel, a blocker secured to the ratchet wheel and oscillatable with respect thereto, said blocker having square teeth, the sum of the thickness of the pawl and square teeth being less than the pitch of the teeth of the ratchet wheel.

11. In combination, a rotatable element having teeth formed thereon, said teeth being provided with a load holding face on one side, a pawl having a load holding face adapted to engage a load holding face of a tooth, means for making an engagement of the pawl with a tooth while said element is rotating in a single direction to stop the element, and means for preventing a partial such engagement of the pawl with one tooth and for effecting a full engagement of the adjacent tooth.

12. In combination, a ratchet wheel having teeth formed thereon, a pawl adapted to engage a tooth of said wheel, means for urging the pawl toward the wheel and a blocker closing off a portion of the space between adjacent teeth, said wheel having a circular recess and said blocker having a cylindrical surface nested within said recess, resilient means normally urging the blocker into blocking position, said blocker being yieldable in a circumferential direction to an unblocking position under the influence of the pawl when said pawl is moving into substantially fully engaged position with the wheel.

13. A combination as described in claim 12, said blocker comprising a wheel having substantially square teeth thereon, the teeth being located adjacent the teeth of the ratchet wheel.

14. The combination as described in claim 12, said blocker having square teeth the circumferential length of which when added to the circumferential length of the pawl being less than the pitch between adjacent teeth on the ratchet wheel.

15. In combination, a toothed element, a pawl for engaging the toothed element, said tooth and pawl being capable of relative rotation, means for making an engagement of the pawl with a tooth while said element and pawl are rotating relative to each other in a single direction to stop the relative rotation, and means for preventing a partial such engagement of said pawl with a tooth to prevent injury to the ends of the tooth or pawl.

JOHN M. SIMPSON.